United States Patent
Joshi et al.

(10) Patent No.: US 11,822,452 B2
(45) Date of Patent: Nov. 21, 2023

(54) DYNAMIC REMOTE COLLECTION OF SUPPLEMENTAL DIAGNOSTIC DATA AND TRIGGERING OF CLIENT ACTIONS FOR CLIENT SOFTWARE APPLICATION

(71) Applicant: Microsoft Technology Licensing, LLC, Redmond, WA (US)

(72) Inventors: Dhruv Joshi, Bellevue, WA (US); Fumiaki Yagi, Issaquah, WA (US); Brian Allan Mueller, Redmond, WA (US); Chaitanya Gogineni, Hyderabad (IN); Dolly Sobhani, Seattle, WA (US); Suneetha Dhulipalla, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/355,088

(22) Filed: Jun. 22, 2021

(65) Prior Publication Data
US 2022/0405185 A1 Dec. 22, 2022

(51) Int. Cl.
G06F 11/34 (2006.01)
G06F 9/54 (2006.01)

(52) U.S. Cl.
CPC .......... *G06F 11/3409* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 8,429,467 B2* | 4/2013 | Fallen | G06F 11/0778 714/37 |
| 9,590,880 B2 | 3/2017 | Ashby et al. | |
| 10,481,993 B1* | 11/2019 | Sharifi Mehr | G06F 11/0775 |
| 2005/0182750 A1* | 8/2005 | Krishna | G06F 11/3438 714/E11.2 |
| 2005/0273667 A1 | 12/2005 | Shrivastava et al. | |
| 2010/0042875 A1* | 2/2010 | Grodnik | G06F 11/3636 714/45 |
| 2010/0125657 A1* | 5/2010 | Dowling | G06F 11/3495 709/224 |
| 2010/0325150 A1* | 12/2010 | Mordetsky | G06F 11/3495 707/769 |

(Continued)

OTHER PUBLICATIONS

"International Search Report & Written Opinion issued in PCT Application No. PCT/US22/029094", dated Aug. 18, 2022, 13 Pages.

*Primary Examiner* — Charles E Anya
(74) *Attorney, Agent, or Firm* — NovoTechIP International PLLC

(57) ABSTRACT

A system and method for sampling telemetry events are provided. The method includes monitoring, using at least one listening module, execution of instructions by a processor, identifying, using the at least one listening module, one or more unique tags, determining, based on one or more trigger conditions, if the one or more unique tags is associated with at least one of the one or more trigger conditions, wherein the one or more trigger conditions are dynamically modifiable via a remote device, obtaining, based on the determination, a portion of a stack data structure associated with the execution of the instructions by the processor; and performing, based on the determination, at least one action.

20 Claims, 5 Drawing Sheets

(56) References Cited

U.S. PATENT DOCUMENTS

| | | | |
|---|---|---|---|
| 2012/0110042 A1* | 5/2012 | Barsness | G06F 16/21 |
| | | | 707/825 |
| 2017/0177416 A1* | 6/2017 | Altman | G06F 11/3414 |
| 2017/0244595 A1* | 8/2017 | Venkataraman | G06F 11/3604 |
| 2018/0024873 A1* | 1/2018 | Milliron | G06F 9/542 |
| | | | 719/318 |
| 2020/0379875 A1 | 12/2020 | Krishnaswamy et al. | |
| 2021/0026746 A1 | 1/2021 | Larkin et al. | |
| 2022/0222097 A1* | 7/2022 | Lokesharadhya | G06F 11/301 |

\* cited by examiner

DYNAMIC REMOTE COLLECTION OF SUPPLEMENTAL DIAGNOSTIC DATA AND TRIGGERING OF CLIENT ACTIONS FOR CLIENT SOFTWARE APPLICATION

BACKGROUND

In order to optimize performance of various programs, developers traditionally seek to find and remove sources of problems and failures of a software product during product testing. In some cases, testing of the software product can continue after the product is released to end-users. For example, software can include error reporting services that are configured to allow information regarding various software problems to be collected and communicated to developers. When a failure or error occurs, the error reporting service can collect information about the operating conditions on the computer leading up to the error. This information, along with similar error reports from other computers executing the same application, may be sent to a central server, creating a database of failure that can be analyzed to identify software bugs that can be corrected.

Similarly, software vendors may seek to refine and improve their software products over time, without necessarily responding to error messages. Thus, they may collect software quality metrics on the software product while it is being used by customers. This ongoing process of collecting software quality metrics can increase the likelihood of identifying areas in which the software can be improved. These metrics can relate to frequency and nature of use of software components, usability, reliability, and execution speeds of the software product. Such metrics may be generated by the software program or may be calculated from raw instrumentation data output by a software product as it executes. Upon computation, the metrics may be transmitted to the central location for aggregation and analysis with metrics from other computing devices.

It can be understood that processing data from users at internet-scale for devices is cost prohibitive, both in bandwidth, as well as processing time. In order to achieve large-scale collection and processing of data, more efficient methods are needed to aid in identifying potential new sources of improvement and corrections for the software. Thus, there remain significant areas for new and improved ideas for collecting data and efficiently processing such data.

SUMMARY

In one aspect, a system for dynamic collection of supplemental diagnostic data may include at least one listening module, a processor, and a memory, coupled to the processor, configured to store executable instructions. When executed by the processor, the instructions cause the processor to monitor, using the at least one listening module, the execution of the instructions by the processor. Using a listening module, the system may identify one or more unique identifiers/tags. The system then accesses one or more trigger conditions to determine if the identifier/tag is associated with a trigger condition. The trigger conditions, may be created and/or modified via a remote device. If the system determines that the identifier/tag is associated with a trigger condition, a portion of the stack data structure may be sent to a remote diagnostic system. The system may also perform another action, such as, notifying the user, or taking an action to pause, close, or restart an application or system.

In another aspect, a method for dynamic collection of supplemental diagnostic data may include listening, with a listening module, to any/all of the instructions being executed by a processor. The listening module may then identify one or more unique identifiers/tags. Once the tags are identified, they are evaluated against one or more trigger conditions to determine if the identifier/tag is associated with said trigger conditions. The trigger conditions, may be created and/or modified via a remote device. If it is determined that the identifier/tag is associated with a trigger condition, a portion of the stack data structure may be sent to a remote diagnostic system. Other actions, such as, notifying the user, or taking an action to pause, close, or restart an application or system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
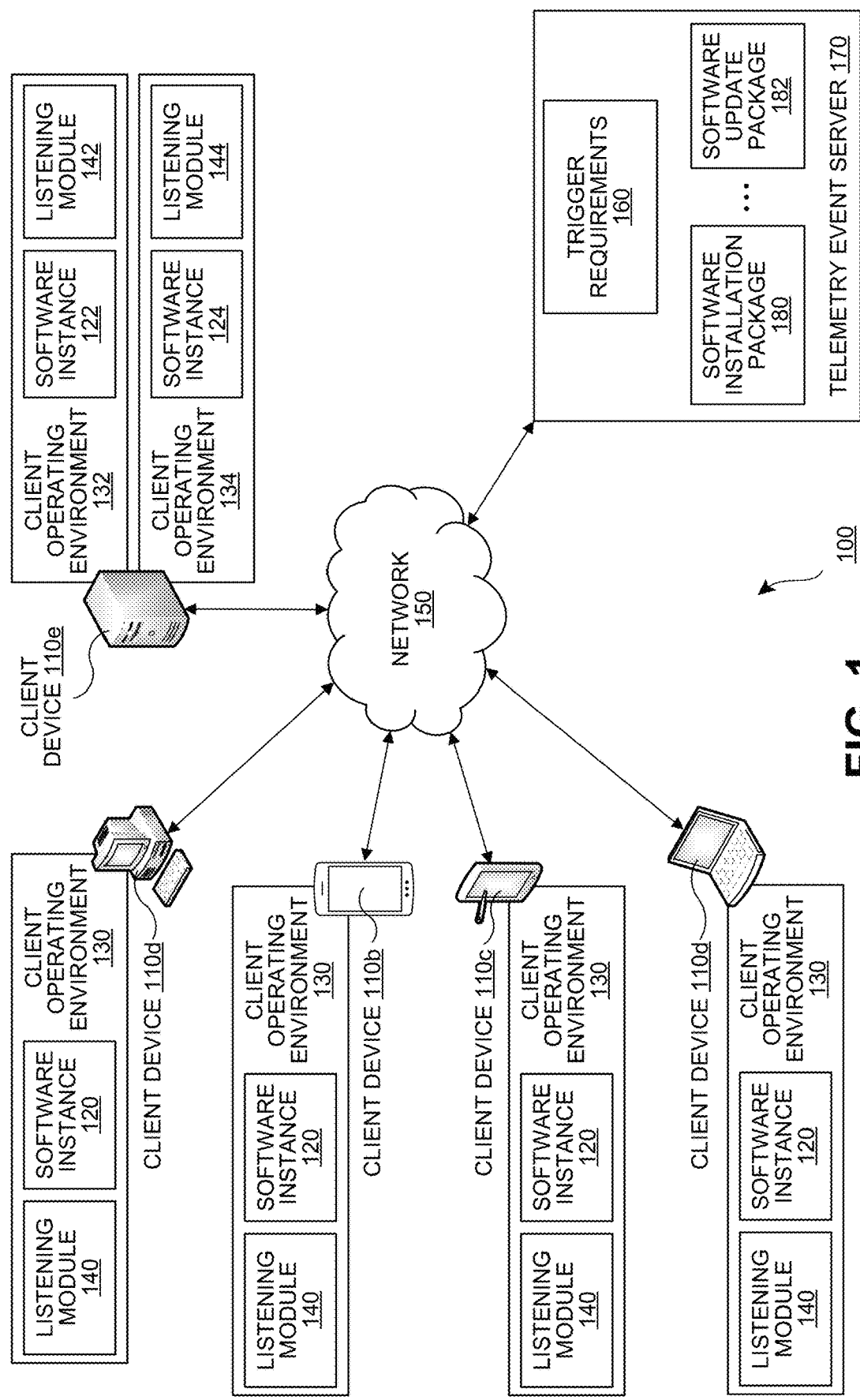
FIG. 1 is a block diagram illustrating an example telemetry event management system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Retrieving large amounts of data over a network may consume valuable server and network resources and may overly burden both the server hardware and the bandwidth hardware when collecting data from a large number of application and/or client devices. Additionally, a service provider or administrator may need to install separate tools on the client devices to facilitate data monitoring and analysis. In some instances, direct interaction with the client devices may be necessary to collect and analyze data. Furthermore, application data may continuously change over time, which may compound the difficulties of collecting and monitoring data for software instances executed across a large number of distributed client devices. The following techniques are disclosed to address these issues by use of machine-based algorithms by which data can be analyzed and information is more selectively and/or meaningfully harvested and acted on.

Telemetry events (a.k.a. diagnostic data events) capture system data associated with a software application (e.g., an Operating Systems, a desktop application, a web-based application, or any other software process being executed by a processor) at runtime when a particular section or line of code has executed. For example, when opening a file in the Microsoft Word® application, a "file open" telemetry event may be emitted. For each application or software instance, there may be different types of telemetry events that are reported, such as, for example, number of times a user selects (e.g., clicks) an application or icon, time required for an application to start, number of users or user accounts associated with the system, usage frequency of the application, usage frequency of particular features of the application, etc., which may provide information or details related to the operation of the application and assist in any analysis.

Although diagnostic events and telemetry data are helpful in data-driven problem solving and decision making, it becomes overburdening at a large scale. As discussed further herein, the primary issue with current telemetry data collection is that as the number of customers increase (e.g., hundreds of millions of uses for Microsoft Word®), the number of telemetry events also increase. When a user base becomes extremely large, the power and computing cost associated with these events increases can greatly impact the bottom line of software management, especially in the backend.

Therefore, there is a need to control the processing cost for telemetry events and mitigate the privacy vulnerability of certain telemetry data in applications.

The present disclosure provides technical solutions to address technical problems associated with the existing telemetry event reporting processes. Briefly, the technical solutions described in the present disclosure address a technical problem related to processing costs for large volumes of telemetry events. The technical solutions include utilizing a built-in listening module to collect telemetry data based on unique identifiers (e.g., tags, flags, bounds, etc.) within the code being executed and one or more trigger factors. The technical solutions provided herein may further include the ability to dynamically create/remove/modify the one or more trigger factors using the local machine or a remote machine.

The features and advantages described herein are not all-inclusive and many additional features and advantages will be apparent to one of ordinary skill in the art in view of the figures and the following descriptions.

FIG. 1 illustrates an example implementation of a system 100 in which some of the proposed techniques described herein may be implemented. The system 100 may include a number of client computing devices 110, which may also be referred to herein as client devices, client systems, and client information handling device 110. In some implementations, one or more of the client devices 110 may, via a listening module 140, communicate with telemetry event server 170 via a data communication network 150. The client devices 110 each may be any suitable computing device capable of executing computer instructions, such as, but not limited to, a desktop computer 110*a*, smartphone 110*b*, a tablet computing device 110*c*, a notebook computer 110*d*, and a server computing system 110*e*.

In the example illustrated, the system 100 includes a single instance of a number of different types of computing devices 110, each having its own respective performance characteristics. However, it should be understood that this disclosure is not limited in this respect, and the techniques described herein can be used to collect information from a single computer, a set of multiple homogeneous types of computers, and/or non-homogeneous computers having any number of instances operating individual or in parallel with other instances.

In some implementations, the client devices 110 may each have one or more client operating environments 130 (i.e., an operating environment), in which a software instance 120 of an installed software application can be executed by the client device 110. In a further implementation, a listening module 140 may be present in the client device 110. The listening module 140 (i.e., runtime listener) may monitor (i.e., listen to) the code as it is executed by the processor. Specifically, the listening module 140 may monitor the execution of the code looking for one or more unique identifiers (e.g., tags, flags, bounds, etc.) within the code.

In an additional implementation, each of the client devices 110*a*, 110*b*, 110*c*, and 110*d* may include an operating environment 130 as well as a software instance 120 and a listening module 140. An operating environment 130 may include hardware components of its respective client device 110 and resources (e.g., allocated amounts of partial resources) provided by the client device 110 for execution of the software instance 120, such as, but not limited to, compute (processor type, number of cores or processors, processor frequency, etc.), memory, storage, and network hardware and resources.

As a general matter, a "software component" may be any suitable type or types of software, and may include any suitable set of computer-executable instructions implemented or formatted in any suitable manner. Software components may be implemented as application software, although the techniques described herein are applicable to other types of software components, such as system software (e.g., components of an operating system).

In at least one implementation, a client device 110 may provide multiple operating environments 130 and/or software instances 120. An example of this is depicted with reference to the server computing system 110*e*, which includes a first operating environment 132 with a first software instance 122 and a first listening module 142, as well as a second operating environment 134 with a second software instance 124 and a second listening device 144. In some implementations, multiple operating environments operate concurrently, while in other implementations, they operate at different times, but with different configurations. For example, each of the first operating environment 132 and second operating environment 134 may be associated with two different user accounts. In some implementations, first operating environment 132 and second operating environment 134 may be virtualized operating environments, such as but not limited to virtual machines, containers, or jails. In some implementations, a single listening module 140 may be used for multiple operating environments 130 of a client device 110.

In some implementations, and as shown in FIG. 1, the trigger requirements 160 are configured to guide the listening module 140 to monitor the performance of software instances 120. The telemetry event server 170 may be further configured to make use of the received telemetry data items to detect, diagnose, and resolve issues indicated by the telemetry data items. Because the telemetry event server 170 is located remotely relative to the client devices 110 and, in some instances, some or all of the client devices 110 may have intermittent or otherwise limited access to the network 150 for communicating with the telemetry event server, it is difficult and/or costly for the service to receive, store, and analyze a large volume of raw telemetry data items from each of the listening module 140.

In order to reduce the volume of telemetry received by the telemetry event server 170 while providing the ability to collect meaningful telemetry data from a large population of listening module 140, in different implementations, the listening module 140 are configured to respond to targeting rules that control the conditions under which telemetry data items are produced and what information they contain. As described herein, the telemetry service is configured to perform a machine-based analysis of received telemetry data items to detect and assess performance-related issues and provide targeting rules to the listening module 140. These rules, when applied by the listening module 140, produce new targeted telemetry data items that facilitate the resolution of performance issues and distribution of updated software components, such as software installation package(s) 180 and/or software update package(s) 182 distributed to the client devices 110 via the telemetry event server 170.

The network 150 may be a conventional type, wired and/or wireless, and may have numerous different configurations, including a star configuration, token ring configuration, or other configurations. For example, the network 150 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 150 may also be coupled to or include portions of a telecommunications network for sending data in a variety of different communication protocols. In some implementations, the network 150 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 110a . . . 110e (or collectively client device 110) may include virtual or physical computer processors, memor(ies), communication interface(s)/device(s), etc., which along with other components of the client device 110 are coupled to the network 150 via communication lines for communication with other entities of the system 100. In some implementations, the client device 110 may send and receive data to and from other client device(s) 110 and/or the telemetry event server 170 and may further analyze and process the data.

Accordingly, as discussed herein, laggy response and/or poor user-perceived interactions can have a significant negative effect on user experience. Thus, not only does the typical user interaction with software need to be smooth and quick, but it is also expected that the monitoring, recognizing, and resolving of issues take place quickly and with very low latency.

In some implementations, the codebase, made up of the executable instructions, may have the ability to automatically create unique identifiers (e.g., tags, flags, bounds, etc.) at various points in code to indicate various process values and/or indicate the most recent or most advanced code executed from within the codebase. In a further implementation, and shown in FIG. 2, the system 200 may have a listening module 210 and a remote diagnostic device 220. In some implementations, the listening module 210 may be physically housed within the client device 110, or it may be a stand-alone device. In some implementations, the listening module 210 may monitor the execution of code by the processor 211 in order to determine if one or more unique identifiers are present in the executed code 212.

In a further implementation, once the listening module 210 identifies a unique identifier, it is evaluated based one or more dynamic trigger rules 213. It should be understood that although FIG. 1 shows the dynamic trigger rules 213 being stored/housed within the listening device, that this is only one potential implementation. In additional or alternative implementations, the trigger rules 213 may be housed in a secondary storage device or an entirely separate system. As described herein, the trigger rule(s) 213 may be for any single unique identifier and/or any logical combination of identifiers (e.g., TAG-1 only, TAG-1 and TAG-2, TAG-1, TAG-2, . . . , and TAG-n, TAG-1 or TAG-2, TAG-1, TAG-2 . . . , or TAG-n). Moreover, in some implementations, the selection of which TAG (i.e., unique identifier), may depend on the desired execution scenario, as discussed herein.

Figure 2:
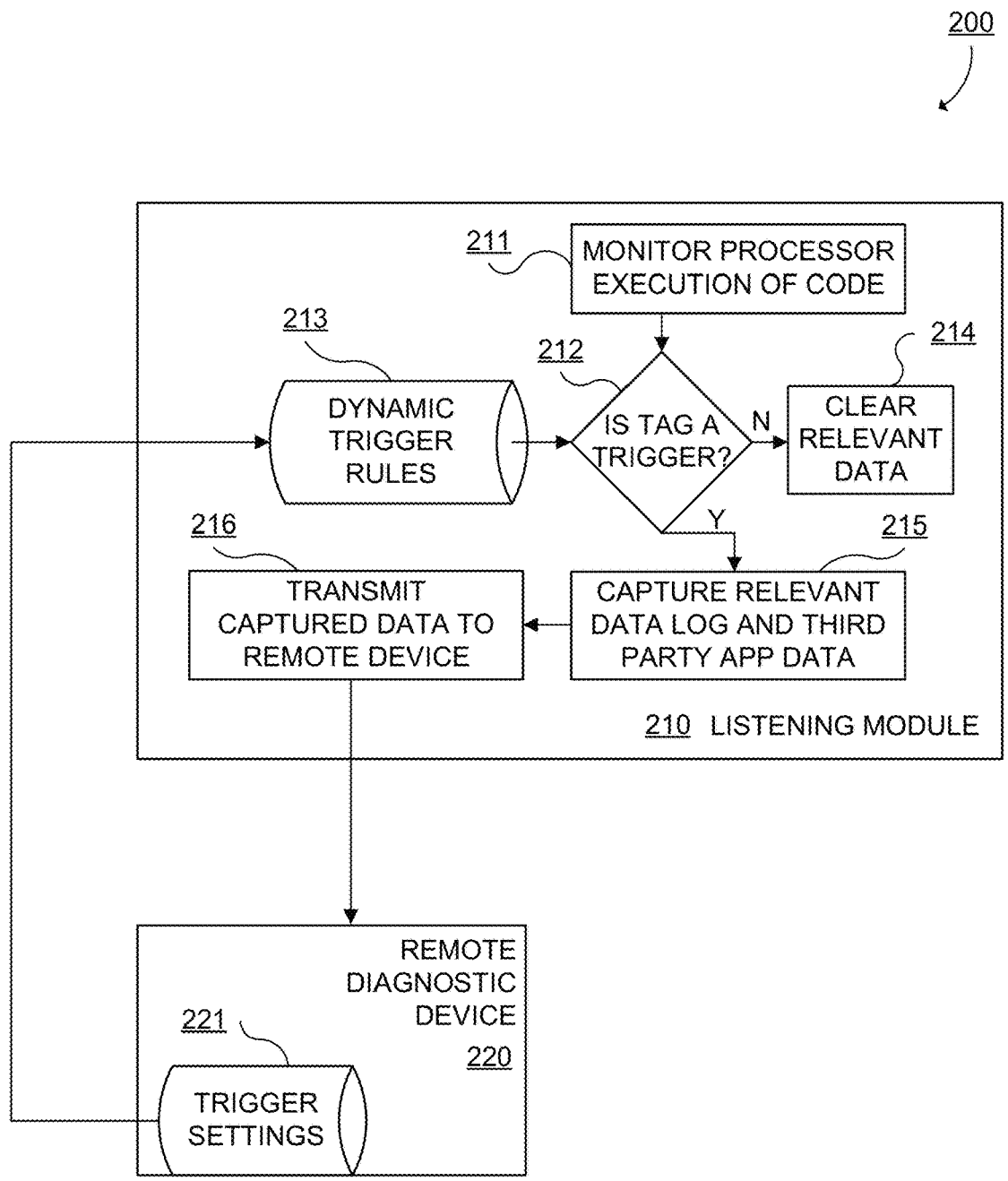
FIG. 2 is a schematic diagram illustrating an example process for managing telemetry event reporting.

In some implementations, and as shown in FIG. 2, the dynamic trigger rules 213 may be modified via a remote diagnostic device 220. The remote diagnostic device 220 may contain a data store of trigger settings 221, which can be dynamically sent to any subset of users or client devices 110 based on one or more characteristics. By way of non-limiting example, the one or more characteristics may be associated with user/device geo-location, user/device language type, user/device release audience, user/device version, user/device demographic, user/device authentication, user/device account type, user/device account age, user/device account login frequency, user/device temporal characteristic associated with user login, and user threat level.

Accordingly, in some embodiments of system 200, a technician or someone of skill in the art may use the remote diagnostic device 200 to create, delete, and/or modify the one or more trigger settings 221. Once the trigger settings 221 are updated, they may be transmitted to one or more clients based on a user request, predetermined schedule, threat level, and/or user setting. For example, the trigger settings may utilize a push or pull updating system. Moreover, as discussed herein, a user or smart algorithm may determine the parameters for deployment of the trigger settings 221, such as, for example, only sending the trigger settings to users within a certain company, state, country, industry, authentication level, etc.

Once the trigger settings 221 are accessible to the listening module 210 (i.e., are stored in a device that the listening module has access to), the listening module may determine 212 if an identifier found while monitoring the code execution 211 is associated, or fits within, one or more of the dynamic trigger rules 213. Accordingly, in some implementations, and as shown in FIG. 2, if the listening module 210 determines that the identifier (i.e., tag) is not associated or within the bound of one or more of the trigger rules 212, it may clear or dump the relevant data 214. In an alternative implementation, if the listening module 210 determines that the identifier (i.e., tag) is associated or within the bound of one or more of the trigger rules 212, it may capture the relevant data 214 (e.g., application log data, third party application data, etc.).

In a further implementation, once the relevant data is captured 215, the listening module 210, or the client device 110, may perform or carry out one or more actions. By way of non-limiting example, in some implementations, the one or more actions may comprise transmitting the capture data to one or more remote devices 216. In some implementations, a portion (e.g., the entirety of or a subset of) the captured data may be transmitted to a remote device 216. Moreover, in some implementations, the captured data may be data from a running processor thread and/or a background thread processor thread.

It should be understood, that although transmission of the captured data is used as an illustrative example in FIG. 2 and above, that other potential actions may be carried out as well. By way of non-limiting example, the system 200 may notify or provide information to a user regarding the current action (e.g., any action being performed by the listening module, client device, remote diagnostic device, or the like). The notification/information may be provided in any number of methods, such as, for example, visually (e.g., on a display device), auditorily (e.g., using a speaker or the like), haptically (e.g., via a wearable device), or any other known or future method of user interaction.

In some implementations, the system may take more drastic actions. Such as, for example, if the system detects a potential threat (e.g., virus, malware, trojan horse, worm, spyware, malicious code, etc.), the one or more actions may comprise force closing one or more applications, force closing one or more instances of a single application, force closing the system or shutting down the device, restarting one or more application, backing-up a portion of the device data, and/or creating a connection to a remote device (i.e., to allow for technical support). Thus, in some implementations, the system may be required to perform administrator level actions on a computer environment.

Figure 3:
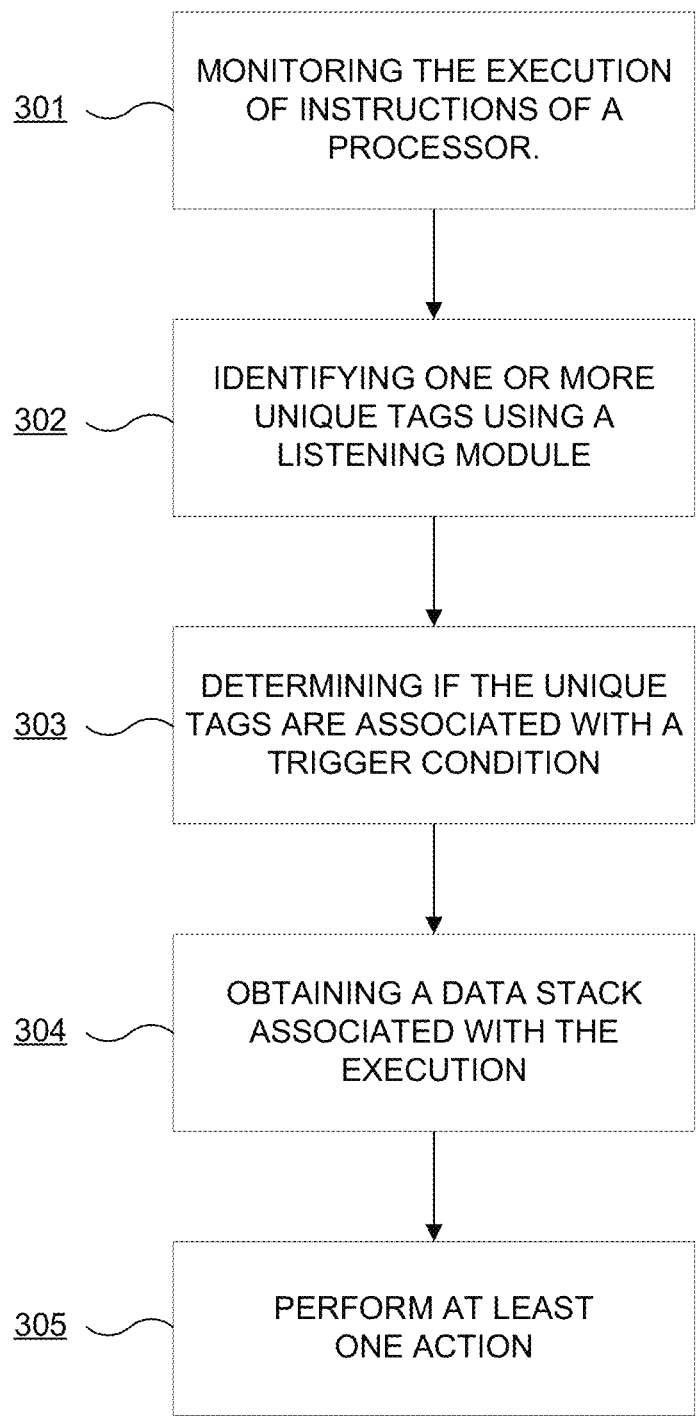
FIG. 3 is a flow chart of an example method for managing telemetry event reporting.

Referring now to FIG. 3, an illustrative example is shown as a flow chart of the systems and methods disclosed herein for sampling telemetry events. Specifically, the system may monitor the instructions being executed by a processor as well the results of those executions 301. As disclosed herein, this monitoring may be carried out by a listening device or module (see FIG. 2 210). The listening module may then identify one or more unique identifiers (i.e., tags) within the executed code 302. The tags may be created by in various ways, as discussed herein. Specifically, an application's codebased may have the ability to automatically create unique tags at various points in the code (e.g., to indicate at what point the code execution reached). In further implementations, the tags may be created based on a heuristic learning algorithm, an Artificial Intelligence system, one or more users, or the like.

Once the tags are identified 302, the system determines if the unique tag is associated with one or more trigger conditions 303. As discussed herein, the trigger conditions are dynamic and modifiable, even from a remote location. If the system determines that the unique tag is associated with a trigger condition 303, a data stack is obtained which contains information/details associated with the code execution 304. Finally, once the data stack is obtained 304, the system may perform at least one action 305, as discussed in greater detail herein.

The detailed examples of systems, devices, and techniques described in connection with FIGS. 1-3 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-2B are implemented in respective modules, which may also be referred to as, and/or include, logic, components, units, and/or mechanisms. Modules may constitute either software modules (e.g., code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (e.g., configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (e.g., hardwired), and/or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module includes a programmable processor configured by software to become a special-purpose processor, the programmable processor may be configured as respectively different special-purpose processors (e.g., including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (e.g., the Internet) and/or via one or more software interfaces (e.g., an application program interface (API)). The performance of certain of the operations may be distributed among the processors, not only residing within a single machine, but deployed across a number of machines. Processors or processor-implemented modules may be located in a single geographic location (e.g., within a home or office environment, or a server farm), or may be distributed across multiple geographic locations.

Figure 4:
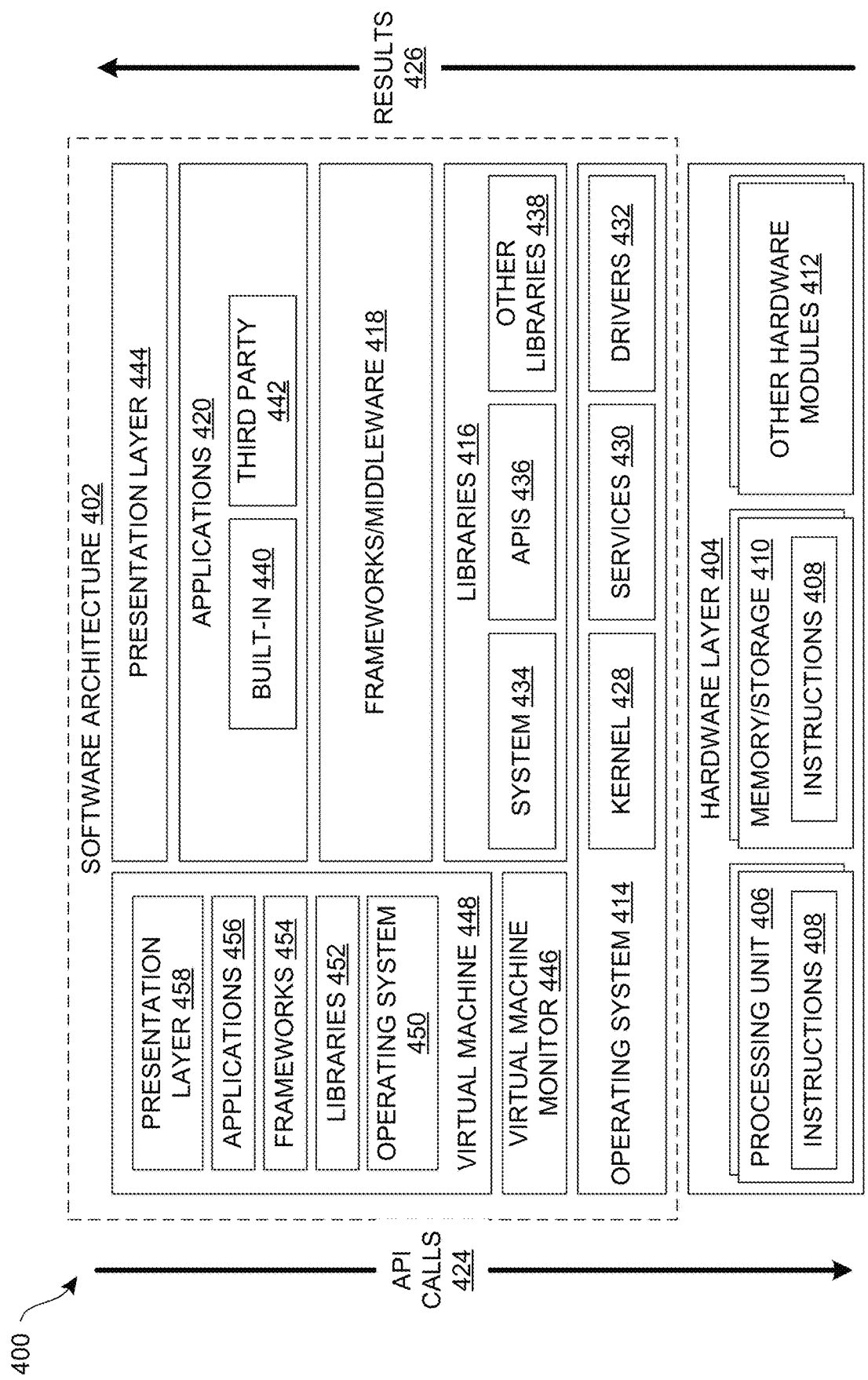
FIG. 4 is a block diagram illustrating an example software architecture.

FIG. 4 is a block diagram 400 illustrating an example software architecture 402, various portions of which may be used in conjunction with various hardware architectures herein described, which may implement any of the above-described features. FIG. 4 is a non-limiting example of a software architecture, and it will be appreciated that many other architectures may be implemented to facilitate the functionality described herein. The software architecture 402 may execute on hardware such as a device that includes, among other things, document storage, processors, memory, and input/output (I/O) components. The representative hardware layer 404 includes a processing unit 406 and associated executable instructions 408. The executable instructions 408 represent executable instructions of the software architecture 402, including implementation of the methods, modules and so forth described herein. The hardware layer 404 also includes a memory/storage 410, which also includes the executable instructions 408 and accompanying data. The hardware layer 404 may also include other hardware modules 412. Instructions 408 held by processing unit 408 may be portions of instructions 408 held by the memory/storage 410.

The example software architecture 402 may be conceptualized as layers, each providing various functionality. For example, the software architecture 402 may include layers and components such as an operating system (OS) 414, libraries 416, frameworks 418, applications 420, and a presentation layer 444. Operationally, the applications 420 and/or other components within the layers may invoke API calls 424 to other layers and receive corresponding results 426. The layers illustrated are representative in nature and other software architectures may include additional or different layers. For example, some mobile or special purpose operating systems may not provide the frameworks/middleware 418.

The OS 414 may manage hardware resources and provide common services. The OS 414 may include, for example, a kernel 428, services 430, and drivers 432. The kernel 428 may act as an abstraction layer between the hardware layer 404 and other software layers. For example, the kernel 428 may be responsible for memory management, processor management (for example, scheduling), component management, networking, security settings, and so on. The services 430 may provide other common services for the other software layers. The drivers 432 may be responsible for controlling or interfacing with the underlying hardware layer 404. For instance, the drivers 432 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 416 may provide a common infrastructure that may be used by the applications 420 and/or other components and/or layers. The libraries 416 typically provide functionality for use by other software modules to perform tasks, rather than rather than interacting directly with the OS 414. The libraries 416 may include system libraries 434 (for example, C standard library) that may provide functions such as memory allocation, string manipulation, file operations. In addition, the libraries 416 may include API libraries 436 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 416 may also include a wide variety of other libraries 438 to provide many functions for applications 420 and other software modules.

The frameworks 418 (also sometimes referred to as middleware) provide a higher-level common infrastructure that may be used by the applications 420 and/or other software modules. For example, the frameworks 418 may provide various graphic user interface (GUI) functions, high-level resource management, or high-level location services. The frameworks 418 may provide a broad spectrum of other APIs for applications 420 and/or other software modules.

The applications 420 include built-in applications 440 and/or third-party applications 442. Examples of built-in applications 440 may include, but are not limited to, a contacts application, a browser application, a location application, a media application, a messaging application, and/or a game application. Third-party applications 442 may include any applications developed by an entity other than the vendor of the particular platform. The applications 420 may use functions available via OS 414, libraries 416, frameworks 418, and presentation layer 444 to create user interfaces to interact with users.

Some software architectures use virtual machines, as illustrated by a virtual machine 448. The virtual machine 448 provides an execution environment where applications/modules can execute as if they were executing on a hardware machine (such as the machine 500 of FIG. 5, for example). The virtual machine 448 may be hosted by a host OS (for example, OS 414) or hypervisor, and may have a virtual machine monitor 446 which manages operation of the virtual machine 448 and interoperation with the host operating system. A software architecture, which may be different from software architecture 402 outside of the virtual machine, executes within the virtual machine 448 such as an OS 450, libraries 452, frameworks 454, applications 456, and/or a presentation layer 458.

Figure 5:
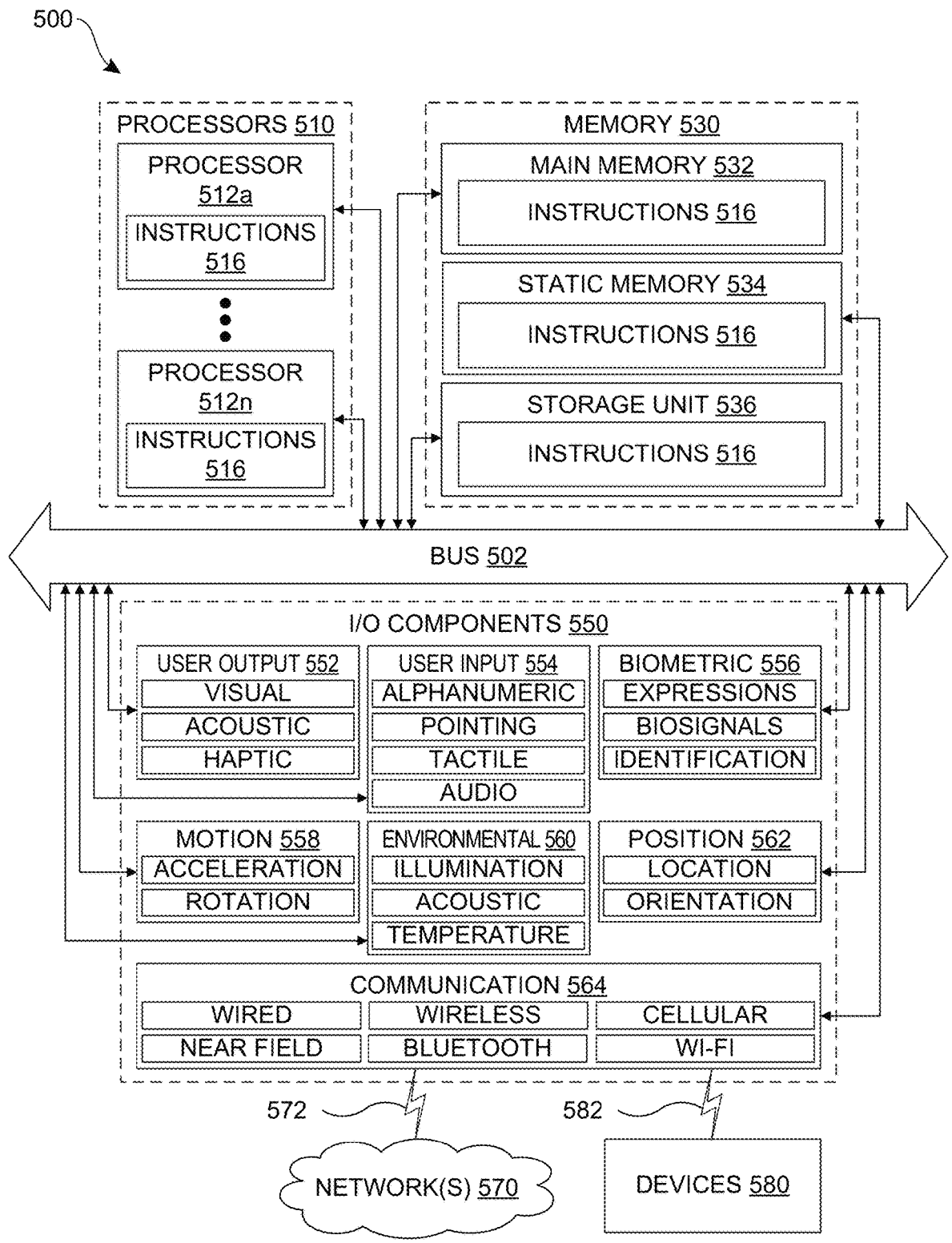
FIG. 5 is a block diagram illustrating components of an example machine configured to read instructions from a machine-readable medium.

FIG. 5 is a block diagram illustrating components of an example machine 500 configured to read instructions from a machine-readable medium (for example, a machine-readable storage medium) and perform any of the features described herein. The example machine 500 is in a form of a computer system, within which instructions 516 (for example, in the form of software components) for causing the machine 500 to perform any of the features described herein may be executed. As such, the instructions 516 may be used to implement modules or components described herein. The instructions 516 cause unprogrammed and/or unconfigured machine 500 to operate as a particular machine configured to carry out the described features. The machine 500 may be configured to operate as a standalone device or may be coupled (for example, networked) to other machines. In a networked deployment, the machine 500 may operate in the capacity of a server machine or a client machine in a server-client network environment, or as a node in a peer-to-peer or distributed network environment. Machine 500 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 500 is illustrated, the term "machine" includes a collection of machines that individually or jointly execute the instructions 516.

The machine 500 may include processors 510, memory 530, and I/O components 550, which may be communicatively coupled via, for example, a bus 502. The bus 502 may include multiple buses coupling various elements of machine 500 via various bus technologies and protocols. In an example, the processors 510 (including, for example, a central processing unit (CPU), a graphics processing unit (GPU), a digital signal processor (DSP), an ASIC, or a suitable combination thereof) may include one or more processors 512a to 512n that may execute the instructions 516 and process data. In some examples, one or more processors 510 may execute instructions provided or identified by one or more other processors 510. The term "processor" includes a multi-core processor including cores that may execute instructions contemporaneously. Although FIG. 5 shows multiple processors, the machine 500 may include a single processor with a single core, a single processor with multiple cores (for example, a multi-core processor), multiple processors each with a single core, multiple processors each with multiple cores, or any combination thereof. In some examples, the machine 500 may include multiple processors distributed among multiple machines.

The memory/storage 530 may include a main memory 532, a static memory 534, or other memory, and a storage unit 536, both accessible to the processors 510 such as via the bus 502. The storage unit 536 and memory 532, 534 store instructions 516 embodying any one or more of the functions described herein. The memory/storage 530 may also store temporary, intermediate, and/or long-term data for processors 510. The instructions 516 may also reside, completely or partially, within the memory 532, 534, within the storage unit 536, within at least one of the processors 510 (for example, within a command buffer or cache memory), within memory at least one of I/O components 550, or any suitable combination thereof, during execution thereof. Accordingly, the memory 532, 534, the storage unit 536, memory in processors 510, and memory in I/O components 550 are examples of machine-readable media.

As used herein, "machine-readable medium" refers to a device able to temporarily or permanently store instructions and data that cause machine 500 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 516) for execution by a machine 500 such that the instructions, when executed by one or more processors 510 of the machine 500, cause the machine 500 to perform and one or more of the features described herein. Accordingly, a "machine-readable medium" may refer to a single storage device, as well as "cloud-based" storage systems or storage networks that include multiple storage apparatus or devices.

The I/O components 550 may include a wide variety of hardware components adapted to receive input, provide output, produce output, transmit information, exchange information, capture measurements, and so on. The specific I/O components 550 included in a particular machine will depend on the type and/or function of the machine. For example, mobile devices such as mobile phones may include a touch input device, whereas a headless server or IoT device may not include such a touch input device. The examples of I/O components illustrated in FIG. 5 are in no way limiting, and other types of components may be included in machine 500. The grouping of I/O components 550 are merely for simplifying this discussion, and the grouping is in no way limiting. In various examples, the I/O components 550 may include user output components 552 and user input components 554. User output components 552 may include, for example, display components for displaying information (for example, a liquid crystal display (LCD) or a projector), acoustic components (for example, speakers), haptic components (for example, a vibratory motor or force-feedback device), and/or other signal generators. User input components 554 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 550 may include biometric components 556, motion components 558, environmental components 560, and/or position components 562, among a wide array of other physical sensor components. The biometric components 556 may include, for example, components to detect body expressions (for example, facial expressions, vocal expressions, hand or body gestures, or eye tracking), measure bio signals (for example, heart rate or brain waves), and identify a person (for example, via voice-, retina-, fingerprint-, and/or facial-based identification). The motion components 558 may include, for example, acceleration sensors (for example, an accelerometer) and rotation sensors (for example, a gyroscope). The environmental components 560 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 562 may include, for example, location sensors (for example, a Global Position System (GPS) receiver), altitude sensors (for example, an air pressure sensor from which altitude may be derived), and/or orientation sensors (for example, magnetometers).

The I/O components 550 may include communication components 564, implementing a wide variety of technologies operable to couple the machine 500 to network(s) 570 and/or device(s) 580 via respective communicative couplings 572 and 582. The communication components 564 may include one or more network interface components or other suitable devices to interface with the network(s) 570. The communication components 564 may include, for example, components adapted to provide wired communication, wireless communication, cellular communication, Near Field Communication (NFC), Bluetooth communication, Wi-Fi, and/or communication via other modalities. The device(s) 580 may include other machines or various peripheral devices (for example, coupled via USB).

In some examples, the communication components 564 may detect identifiers or include components adapted to detect identifiers. For example, the communication components 564 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 562, such as, but not limited to, geo-location via Internet Protocol (IP) address, location via Wi-Fi, cellular, NFC, Bluetooth, or other wireless station identification and/or signal triangulation.

The disclosed implementations can incorporate any of the features, components, methods, systems, software, and other aspects described in U.S. Pat. No. 9,590,880 (entitled "DYNAMIC COLLECTION ANALYSIS AND REPORTING OF TELEMETRY DATA" and issued on Mar. 7, 2017) and U.S. Patent Application Publication Numbers 2020/0272552 (entitled "MACHINE-BASED RECOGNITION AND DYNAMIC SELECTION OF SUBPOPULATIONS FOR IMPROVED TELEMETRY" and published on Aug. 27, 2002); 2018/0365093 (entitled "DETERMINING A LIKELIHOOD OF A RESOURCE EXPERIENCING A PROBLEM BASED ON TELEMETRY DATA" and published on Dec. 20, 2018); 2018/0300180 (entitled "RESOURCE DEPLOYMENT USING DEVICE ANALYTICS" and published on Oct. 18, 2018); 2018/0234443 (entitled "SYSTEM AND METHOD FOR DETECTING ANOMALIES INCLUDING DETECTION AND REMOVAL OF OUTLIERS ASSOCIATED WITH NETWORK TRAFFIC TO CLOUD APPLICATIONS" and published on Aug. 16, 2018); 2017/0147466 (entitled "MONITORING ACTIVITY ON A COMPUTER" and published on May 25, 2017); 2016/0147585 (entitled "PERFORMANCE ANOMALY DIAGNOSIS" and published on May 26, 2016); 2014/0189086 (entitled "COMPARING NODE STATES TO DETECT ANOMALIES" and published on Jul. 3, 2014); 2013/0346466 (entitled "IDENTIFYING OUTLIERS IN A LARGE SET OF OBJECTS" and published on Dec. 26, 2013); 2013/0343619 (entitled "DENSITY ESTIMATION AND/OR MANIFOLD LEARNING" and published on Dec. 26, 2013); and 2010/0251218 (entitled "DYNAMIC COLLECTION OF INSTRUMENTATION DATA" and published on Sep. 30, 2010) each of which is incorporated by reference herein in their entireties.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A client system for dynamic collection of supplemental diagnostic data, comprising:
   at least one listening module;
   a processor; and
   a memory, coupled to the processor, and storing executable instructions, wherein the instructions, when executed by the processor, cause the processor to:
   monitor, using the at least one listening module, execution of the instructions by the processor;
   identify, using the at least one listening module, one or more unique tags within the instructions;
   upon identifying the one or more unique tags within the instructions, examine the one or more unique tags to determine if one of the one or more unique tags fits within at least one of one or more trigger conditions wherein the one or more trigger conditions are dynamically modifiable via a remote diagnostic device and are dynamically sent from the remote diagnostic device to the client system based on one or more characteristics associated with at least the client system or a user of the client system;
   upon determining that one of the one or more unique tags fits within the at least one of the one or more trigger conditions, obtain a portion of telemetry data associated with the execution of the instructions by the processor; and
   perform, based on the determination, at least one action on the portion of the telemetry data.

2. The system of claim 1, wherein the instructions are further executable by the processor to generate, based on a specific instruction being executed, the one or more unique tags associated with the specific instruction.

3. The system of claim 2, wherein the one or more unique tags are stored in the memory.

4. The system of claim 1, wherein the one or more trigger conditions are associated with a user characteristic.

5. The system of claim 4, wherein the user characteristic is a characteristic selected from a group consisting of user geo-location, user language type, user release audience, user version, user demographic, user authentication, user account type, user account age, user account login frequency, temporal characteristic associated with user login, and user threat level.

6. The system of claim 1, wherein the portion of the telemetry data comprises at least one of a portion of a running thread data stack and a portion of a background thread data stack.

7. The system of claim 1, wherein the instructions are further executable by the processor to obtain, based on the determination, data associated with the execution of the instructions by the processor.

8. The system of claim 7, wherein the data associated with the execution of the instructions by the processor comprises data selected from a group consisting of disk log file data, memory dump data, and third-party data.

9. The system of claim 1, wherein performing the at least one action comprises transmitting, to the remote diagnostic device, the portion of the telemetry data.

10. The system of claim 1, wherein performing the at least one action comprises an action selected from a group consisting of:
    providing, using a display device, a user prompt;
    force closing one or more applications;
    force closing one or more instances of a single application; force closing the system;
    restarting one or more applications; and
    transmitting data associated with the execution of the instructions by the processor to the remote diagnostic device.

11. A method for dynamic collection of supplemental diagnostic data on a client system, comprising:
    monitoring, using at least one listening module, execution of instructions by a processor;
    identifying, using the at least one listening module, one or more unique tags within the instructions;
    upon identifying the one or more unique tags within the instructions, examining the one or more unique tags to determine if one of the one or more unique tags fits within at least one of one or more trigger conditions, wherein the one or more trigger conditions are dynamically modifiable via a remote diagnostic device and are dynamically sent from the remote diagnostic device to the client system based on one or more characteristics associated with at least the client system or a user of the client system;
    upon determining that one of the one or more unique tags fits within the at least one of the one or more trigger conditions, obtaining a portion of telemetry data associated with the execution of the instructions by the processor; and
    performing, based on the determination, at least one action on the portion of the telemetry data.

12. The method of claim 11, further comprising generating, based on a specific instruction being executed, the one or more unique tags associated with the specific instruction.

13. The method of claim 12, wherein the one or more unique tags are stored in a memory.

14. The method of claim 11, wherein the one or more trigger conditions are associated with a user characteristic.

15. The method of claim 14, wherein the user characteristic is a characteristic selected from a group consisting of user geo-location, user language type, user release audience, user version, user demographic, user authentication, user account type, user account age, user account login frequency, temporal characteristic associated with user login, and user threat level.

16. The method of claim 11, wherein the portion of the telemetry data comprises at least one of a portion of a running thread data stack and a portion of a background thread data stack.

17. The method of claim 11, further comprising obtaining, based on the determination, data associated with the execution of the instructions by the processor.

18. The method of claim 17, wherein the data associated with the execution of the instructions by the processor comprises data selected from a group consisting of disk log file data, memory dump data, and third-party data.

19. The method of claim 11, wherein performing the at least one action comprises transmitting, to the remote diagnostic device, the portion of the telemetry data.

20. The method of claim 11, wherein performing the at least one action comprises an action selected from a group consisting of:
- providing, using a display device, a user prompt; force closing one or more applications;
- force closing one or more instances of a single application;
- force closing a system associated with the dynamic collection of supplemental diagnostic data;
- restarting one or more applications; and
- transmitting, to the remote diagnostic device, data associated with the execution of the instructions by the processor.

* * * * *